United States Patent
Mulder

(10) Patent No.: US 8,202,707 B2
(45) Date of Patent: Jun. 19, 2012

(54) CONTINUOUS METHOD OF PRODUCING A MASH EXTRACT

(75) Inventor: Hendrikus Mulder, Uitgeest (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 614 days.

(21) Appl. No.: 12/301,440

(22) PCT Filed: May 14, 2007

(86) PCT No.: PCT/NL2007/050207
§ 371 (c)(1),
(2), (4) Date: Apr. 3, 2009

(87) PCT Pub. No.: WO2007/136252
PCT Pub. Date: Nov. 29, 2007

(65) Prior Publication Data
US 2009/0208605 A1 Aug. 20, 2009

(30) Foreign Application Priority Data

May 19, 2006 (EP) .................................. 06114242
May 19, 2006 (EP) .................................. 06114264

(51) Int. Cl.
*C12C 1/00* (2006.01)
*C12C 7/06* (2006.01)

(52) U.S. Cl. ....................................... 435/93; 435/291.1
(58) Field of Classification Search .................... 435/93, 435/291.1
See application file for complete search history.

(56) References Cited

FOREIGN PATENT DOCUMENTS

| DE | 1442183 A1 | 10/1968 |
|---|---|---|
| DE | 1442290 A1 | 10/1968 |
| DE | 1442233 | 11/1968 |
| DE | 1442292 A1 | 11/1968 |
| DE | 1814377 A1 | 6/1970 |
| DE | 2153151 A1 | 5/1973 |
| DE | 10 2005 020639 A1 | 4/2006 |
| WO | WO 92/12231 | 7/1992 |

*Primary Examiner* — Karen Carlson
(74) *Attorney, Agent, or Firm* — Gilberto M. Villacorta; Sunit Talapatra; Foley & Lardner LLP

(57) ABSTRACT

The present invention relates to a continuous method of producing a mash extract by decoction mashing, said method comprising:
a. mixing a first malt enzyme source with an aqueous liquid to obtain an aqueous malt enzyme suspension;
b. separately, mixing a second enzyme source with one or more starch-containing adjuncts to obtain a decoction suspension while maintaining temperature conditions that do not cause significant gelatinization of the starch;
c. subjecting the decoction suspension to a first heat treatment at 60-85° C. to simultaneously partially gelatinize and enzymatically degrade the starch;
d. subjecting the decoction suspension to a second heat treatment at a higher temperature than the first heat treatment to gelatinize the starch at an increased rate and to a higher extent;
e. combining the heated decoction suspension obtained from the second heat treatment with the aqueous malt enzyme suspension from step a. to obtain a mash;
f. maintaining the mash at 35-85° C. for at least minutes; and
g. removing spent grain from the heated mash to produce a mash extract.

The present method is very robust and easy to control. Furthermore, the method yields a mash extract of constant quality.

15 Claims, No Drawings

CONTINUOUS METHOD OF PRODUCING A MASH EXTRACT

TECHNICAL FIELD OF THE INVENTION

The present invention relates to a continuous method of producing a mash extract by decoction mashing. More particularly, the present invention relates to such a decoction mashing method that employs one or more starch-containing adjuncts as a source of fermentable sugars.

BACKGROUND OF THE INVENTION

Decoction mashing is one of the three mashing methods that are often widely used in the production of bottom-fermentation beers, the other two methods being single infusion mashing and step infusion mashing. The process typically requires three vessels: a mash tun for mash mixing, a mash kettle (or copper or mash copper) for boiling, and a lauter tun (or clarifying tun) for straining. Mashing is carried out in a mash tun, and starts at a low temperature while portions of the mash are taken out and boiled in the mash kettle and later returned to the mash tun, thus gradually raising the temperature of the entire mash. The process is usually repeated two or three times, taking two to six hours. The mash temperature may start as low as 35° C., but more often at 45-50° C. to reach 70-78° C. at the end of the mashing process. The mash is then filtered in a separate vessel known as a lauter tun or in specific cases in the mash tun itself over a perforated bottom.

The fact that part of the mash is boiled is the main difference between decoction mashing and the other mashing methods. Because of the boiling, cell walls of the starch containing grains are destroyed. This allows an easier access for the enzymes to the starch. As a result the efficiency of decoction mashes is generally higher than for other mashing methods. Another advantage of decoction mashing is that grains that need gelatinising at high temperatures can be boiled separately in one of the decoction steps. This can be useful if an adjunct such as maize, rice or rye is employed in the mash.

Decoction mashing methods employed within the brewing industry are carried out in a batch-wise fashion.

DE-A 1 442 292 describes a batch decoction process comprising the following steps:
i. mixing malt with water and other ingredients to obtain an aqueous malt enzyme suspension;
ii. mixing malt, maize grits and water to obtain a decoction suspension;
iii. liquefying the decoction suspension by first heating at 70° C. for 30 minutes and subsequently heating at 95-100° C. for 10 minutes;
iv. combining the heated decoction suspension and the malt enzyme suspension to obtain a mash;
v. maintaining the mash at 70° C. for 45 minutes; and
vi. removing spent grain.
In the paragraph at the bottom of page 4 it is stated: "In order to avoid high viscosity in the cooker, about 10% of the total malt may be added to the maize grits".

It would be advantageous to carry out decoction mashing in a continuous fashion. Continuous operation of decoction mashing would offer a number of significant advantages, including:
  higher productivity and lower investment: vessels can be operated for prolonged periods of time under full load, meaning that for equal production volume smaller vessels are needed than in a batch process;
  constant and better quality: process is easier to control due to possibility of adapting process parameters to local and instantaneous requirements and because steady-state-conditions are much more stable;
  high hygienic standard: continuous process is operated in a closed system.
  less energy: energy consumption is evenly spread, without major use peaks;
  less labour: operation of continuous process requires less attention
  less standstill and cleaning: continuous process can be operated at much longer runlengths than batch processes.

U.S. Pat. No. 3,171,746 describes a continuous method of producing wort using a double decoction process in which a mash is prepared in a mixer-separator from malt and water and separated in a thick mash and a thin mash. The thick mash is subjected to temperature conditions such that proteolysis and saccharification will occur, whereas the thin mash, which is rich in enzymes, is decocted and then reunited with the thick mash after the thick mash has completed the proteolytic and saccharification actions.

DE-A 18 14 377 describes a double decoction process for the continuous production of wort wherein a mash is prepared by combining malt and water and wherein part of the mash is fed to a vessel in which it is subjected to heat treatment before it is recombined with the remainder of the mash that has not been subjected to such heat treatment. Next, again a part of the mash is fed to a vessel in which it is heat processed before being combined with the remainder of the mash that has not been heat treated, following which the mash is separated in wort and spent grain.

WO 92/12231 describes a process for the continuous preparation of wort comprising continuous enzymatic conversion of malt in at least one rotating disc contactor. In the example of this patent application a decoction suspension containing maize and malt is maintained at 50° C. for 5 minutes, heated to 95° C. for 10-15 minutes in a rotating disc contactor, combined with malt/water mixture, following which the resulting mixture is first heated to 65° C. for 30 minutes and then to 76° C. for 5 minutes. In this process gelatinisation and enzymatic degradation of the starch contained in the decoction suspension are achieved in a single heat treatment (i.e. 95° C. for 10-15 minutes).

As mentioned herein before, decoction mashing can advantageously be used to produce mash extracts from malt and starch-containing adjuncts. Hence, it would be beneficial if a continuous decoction mashing method could be made available that can suitably be used for producing a mash extract from malt and one or more starch-containing adjuncts.

SUMMARY OF THE INVENTION

The present inventors have designed a method for continuously producing a mash extract by means of decoction mashing, which method offers the advantage that it can be used to produce a high quality mash extract whilst employing substantial amounts of starch-containing adjuncts such as rice, maize, sorghum, barley, wheat and/or rye. The present continuous method is characterised in that it comprises the following steps:
a. mixing a first malt enzyme source with water to obtain an aqueous malt enzyme suspension;
b. separately, mixing a second enzyme source with one or more starch-containing adjuncts to obtain a decoction suspension whilst maintaining temperature conditions that do not cause significant gelatinisation of the starch;

c. subjecting the decoction suspension to a first heat treatment at 60-85° C. to simultaneously partially gelatinise and enzymatically degrade the starch;
d. subjecting the decoction suspension to a second heat treatment at a higher temperature than the first heat treatment to gelatinise the starch at an increased rate and to a higher extent;
e. combining the heated decoction suspension obtained from the second heat treatment with the aqueous malt enzyme suspension from step a. to obtain a mash;
f. maintaining the mash at 35-85° C. for at least 20 minutes; and
g. removing spent grain from the heated mash to produce a mash extract.

In the present method the decoction suspension containing the one or more adjuncts is subjected to a carefully controlled multi-step heat treatment. During this multi-step heat treatment, the starch-containing adjuncts are gelatinised by boiling, following which they can be hydrolysed effectively by the amylases contained in the aqueous malt enzyme suspension with which the heated decoction suspension is (re)combined. During the relatively mild first heat treatment conditions are chosen such that the rate of starch gelatinisation is in pace with the rate of starch hydrolysis, meaning that the viscosity of the decoction suspension is maintained at sufficiently low level to keep the suspension pumpable. During the much more severe second heat treatment, the starch is gelatinised rapidly, making it much more susceptible to enzymatic hydrolysis, which is initiated when the decoction is recombined with the aqueous malt enzyme suspension. Prior to the multistep heat treatment, the temperature is controlled in such a way that significant gelatinisation is prevented and the viscosity is kept at a low level to ensure suitable transport conditions from the mixing vessel to the pump. The present method is very robust and easy to control. Furthermore, the method yields a mash extract of constant quality.

DETAILED DESCRIPTION OF THE INVENTION

Accordingly, the present invention relates to a continuous method of producing a mash extract by decoction mashing, said method comprising:
a. mixing a first malt enzyme source with an aqueous liquid to obtain an aqueous malt enzyme suspension;
b. separately, mixing a second enzyme source with one or more starch-containing adjuncts to obtain a decoction suspension whilst maintaining temperature conditions that do not cause significant gelatinisation of the starch;
c. subjecting the decoction suspension to a first heat treatment at 60-85° C. to simultaneously partially gelatinise and enzymatically degrade the starch;
d. subjecting the decoction suspension to a second heat treatment at a higher temperature than the first heat treatment to gelatinise the starch at an increased rate and to a higher extent;
e. combining the heated decoction suspension obtained from the second heat treatment with the aqueous malt enzyme suspension from step a. to obtain a mash;
f. maintaining the mash at 35-85° C. for at least minutes; and
g. removing spent grain from the heated mash to produce a mash extract.

Preferably, each of the aforementioned steps a. to g. is conducted in a continuous faction, as illustrated in the examples.

The term 'adjunct' as used herein encompasses any cereal grain or fermentable ingredient that can be added to the mash as a source of starch. The adjunct may be malted or unmalted, the latter being preferred. The adjuncts may optionally be pre-processed by e.g. torrification, flaking, cooking, micronisation, roasting. Rice, maize, sorghum, rye, oats, wheat, corn, tapioca flour, potato, malt, barley and combinations thereof can be used for this purpose. Preferably, the adjunct is derived from a cereal selected from the group consisting of rice, maize, sorghum, barley, rye and combinations thereof. Typically, the adjunct employed in the present method contains at least 60%, preferably at least 70% and more preferably at least 75% of starch by weight of dry matter.

In the present method malt may suitably be used as a source of malt enzymes. However, the present invention also encompasses the use of commercial enzyme preparations containing starch degrading enzymes such as those found in malt, notably α-amylase, β-amylase and/or glucoamylase. Furthermore, it is within the scope of the present invention to employ both malt and commercial enzyme preparation, e.g. malt in the preparation of the aqueous malt enzyme suspension and commercial enzymes in the preparation of the decoctions suspension. Preferably, the malt enzymes are employed in the present method in the form of malt.

In accordance with a particularly preferred embodiment of the invention, part of the aqueous malt enzyme suspension prepared in step a. is employed as the second enzyme source in step b. Even more preferably, 1-50 wt. % of the aqueous malt enzyme suspension prepared in step a. is employed as the second enzyme source in step b. and the remainder of the aqueous malt enzyme suspension is combined with the heated decoction suspension obtained from the second heat treatment.

The present invention encompasses a method in which the aqueous malt enzyme suspension is separated in two malt enzyme suspensions that have different solids contents, e.g. a thick and a thin mash suspension. Preferably, however, the composition of the aqueous malt enzyme suspension of step a. and the second enzyme source of step b. is identical. Typically, the solids content of the malt enzyme suspensions employed in the present process is within the range of 200-500 g/l, preferably within the range of 250-350 g/l.

The benefits of the present method are most pronounced when a substantial fraction of the fermentable sugars in the mash extract are provided by the one or more adjuncts. Accordingly, in a preferred embodiment at least 5 wt. %, preferably from at least 10 wt. % and more preferably 20-90 wt. % of the fermentable sugars contained in the mash extract originate from the one or more starch-containing adjuncts.

In the present method the decoction suspension is prepared whilst maintaining temperature conditions that do not cause significant gelatinisation of the starch. More preferably these temperature conditions do not cause gelatinisation of the starch. Advantageously, the aforementioned temperature conditions are maintained until the first heat treatment.

As mentioned herein before, the conditions during the first heat treatment are relatively mild in order to ensure that the rate of gelatinisation remains relatively low and to enable enzymatic degradation of the starch. The partial hydrolysis of the starch during the first heating step counteracts the viscosity increase that normally accompanies starch gelatinisation. Thus, the viscosity increase observed during the first and second heating step may be controlled so as not to exceed the levels that would make the suspension non-pumpable. Typically, the viscosity of the decoction suspension up till the second heat treatment does not exceed 10 Pa·s. Preferably, said viscosity does not exceed 5 Pa·s, more preferably it does not exceed 1 Pa·s. Whenever reference is made herein to viscosities, said viscosities are determined using measured pressure differences over defined pipe diameters and flow conditions (pipe diameter: 25 mm; pipe length: 5 m; flow rate 200 l/hr, assuming Newtonian fluid behaviour).

The heating conditions needed to gelatinise starch during the first and second heat treatment very much depend on the nature of the starch. Certain starches, such as barley starch, start to gelatinise at relatively low temperatures, e.g. 55-62° C. Other starches, such as rice starch, are much more stable towards gelatinisation and will not gelatinise significantly below temperature of 70-80° C. Consequently, the heating conditions to be employed in the first and second heating step need to be tailored to the type of starch present in the decoction suspension.

Typically, the first heat treatment in the present method advantageously involves heating the decoction suspension to within a temperature range of 65-82° C., preferably to within a temperature range of 65-80° C. The duration of the first heat treatment preferably is within the range of 1-30 minutes, more preferably within the range of 2-15 minutes.

Individual starch granules are known to gelatinise over a temperature interval. As temperature increases more starch granules gelatinise. With further increasing temperature the starch granules begin to break down and at peak viscosity the rate of break down starts to exceed gelatinisation and resulting viscosity begins to drop off. In the present method, the decoction suspension reaches its peak viscosity during the second heat treatment. Typically, the viscosity of the decoction suspension after the second heat treatment does not exceed 30 Pa·s. Preferably, said viscosity does not exceed 10 Pa·s and more preferably, said viscosity does not exceed 1 Pa·s. These viscosities are determined in the same way as described herein before.

The second heat treatment of the decoction suspension advantageously involves heating to within a temperature range of 85-120° C., more preferably to within a temperature range of 100-120° C. The duration of the second heat treatment preferably is within the range of 1-30 minutes, more preferably within the range of 2-15 minutes.

According to a particularly preferred embodiment, the first and the second heat treatment of the decoction suspension comprise steam injection. Steam injection offers the advantage that a rapid temperature increase can be realised without the risk of fouling of the heat exchange surface. It is preferred not to employ a rotating disc contactor as described in WO 92/12231 in the first heat treatment of the present method. Likewise, it is preferred to not employ this device in the second heat treatment.

In accordance with yet another preferred embodiment the decoction suspension is cooled to a temperature of 60-100° C. after the second heat treatment and prior to being combined with the aqueous malt enzyme suspension. By cooling the hot decoction suspension before it is combined with the aqueous malt enzyme suspension the temperature of the resulting mash can be controlled effectively.

In the present method the decoction suspension is prepared by mixing the second enzyme source with one or more starch-containing adjuncts. Advantageously in the preparation of the decoction suspension additional water is admixed. Typically, the decoction suspension has a solids content within the range of 200-500 g/l, preferably within the range of 220-400 g/l. According to a particularly preferred embodiment, the solids content of aqueous malt enzyme suspension and the decoction suspension is maintained within the range of 250-350 g/l.

Following the second heat treatment, the mash obtained after recombining the decoction suspension and the aqueous malt enzyme suspension is kept under conditions that favour enzymatic hydrolysis of the gelatinised starch. During this part of the present method starch is converted to fermentable sugars in two stages, liquefaction and saccharification. Liquefaction involves the breakdown of starch to complex sugars (dextrin's) under the influence of e.g. α-amylase. When the liquefaction stage is complete, the mash has become much less viscous. Saccharification, or the breakdown of complex sugars to fermentable sugars occurs under the influence of enzymes such as glucoamylases and β-amylase. Typically, liquefaction and saccharification are achieved in the present method by maintaining the mash at a temperature within the range of 35-85° C., preferably within the range of 40-80° C. In order to achieve adequate conversion of starch into fermentable sugars, usually a residence time at the aforementioned temperatures of at least 20 minutes is required. Preferably, the residence time applied at these temperatures is within the range of 30-120 minutes, more preferably within the range of 40-110 minutes.

The present method may suitably employ tap water or spring water in the preparation of the aqueous malt enzyme suspension and/or the decoction suspension. According to a particularly preferred embodiment, however, the aqueous liquid used to produce the aqueous malt enzyme suspension, and preferably also the decoction suspension, is a recirculated wash water stream from the mash extract production. The use of such a recirculated wash water stream offers the advantage that it enables high extraction yields without the need of using large quantities of water. At the same time, recirculation makes it possible to achieve such high extraction yields whilst at the same time producing a high gravity mash extract.

Accordingly, a particularly advantageous embodiment of the present invention the mash extract is produced by:
a. transferring the heated mash into a first separator for separation into mash extract and spent grain;
b. transferring the spent grain into a first mixing vessel and mixing it with sparging water;
c. transferring the mixture of spent grain and sparging water into a second separator to remove spent grain;
d. recirculating an aqueous stream from the second separator to the production of the aqueous malt enzyme suspension.

The term "separator" as used herein encompasses any device that can suitably be used to separate solids from liquids. Examples of separators that may suitably be used in the present method include: centrifuges, decanters, sedimentors, hydrocyclones, sieves, filters, membranes and presses. Naturally, combinations of different types of separators (e.g. decanters and sieves) may be employed in the present method. Preferably, the separators employed in the present process are selected from the group consisting of centrifuges, decanters and sieves. More preferably, the separators employed are selected from the group consisting of decanters and centrifuges. Most preferably, the separators employed are decanters.

It should be understood that wherever reference is made to a first separator, a second separator, a third separator etc., such first, second or third separator may actually comprises two or more separating devices that together perform the action of separating solids and liquid. These two or more separating devices may be operated in parallel and/or in series. For instance, it may be advantageous to employ a separator that consists of a series of sieves, wherein the pore size of the sieves decreases in the downstream direction. Likewise it can be advantageous to employ a sequence of centrifuges and/or decanter, wherein the centrifugal force applied increases in the downstream direction. It can also be advantageous to operate a number of separating devices in parallel, in particular if the process is operated in a continuous fashion. When run in parallel well below full capacity, failure or shutdown of one separating device does not necessitate interruption of the mash extraction process, meaning that the process can be operated uninterruptedly for prolonged periods of time.

In case two or more separating devices are operated in parallel, the gravity of the mash extract obtained from the separator refers to the weight averaged gravity of the mash extracts obtained from the two or more separating devices that make up the separator. In case two or more separating devices are operated in series, the gravity of the extract obtained from the separator refers to gravity of the extract obtained from the last separating device.

Just like the separators, also the mixing vessels employed in the present process may actually consist of two or more mixing devices that are operated in series or in parallel.

The use of recirculated wash water as described herein before enables the preparation of a high gravity mash extract, e.g. a mash extract with a gravity of 15°P or more. This particular embodiment of the present method can attain very high efficiencies in terms of energy consumption and extraction yields. Furthermore, it can achieve an extremely high productivity in the operation of the brewhouse.

The advantages of the present method are particularly pronounced in case the gravity of the mash extract obtained from the first separator exceeds 18°P. More preferably the gravity of the mash extract exceeds 20°P, even more preferably it exceeds 25°P. In an especially preferred embodiment the gravity of the mash extract obtained from the first separator exceed 28°P, most preferably it exceeds 30°P.

Unexpectedly, it was found that despite the high gravity of the mash extract obtained in the present method, the extract loss observed in the method is typically less than 5 wt. %, preferably less than 4 wt. %, more preferably less than 3 wt. %, most preferably less than 2 wt. %. Preferably, the latter efficiencies are realised across the complete wort production process, including both mash separation and trub separation. The amount of extract loss in the production of a mash extract may suitably be determined by measuring the extract concentration in the liquid phase of the spent grain by a standard method for determining extract concentrations in wort (E.g. density measurement by Anton Paar). Because of the absence of free liquid in dewatered spent grains, said spent grains are conveniently extracted with hot water, following which the exhausted spent grains are separated by filtration. The extract losses can be calculated from the measured extract level in the extraction liquid, taking into account the amount of water added.

In particular if the present method employs a sequence of three or more separators, extract losses can be minimised very effectively. Accordingly, a preferred embodiment of the invention relates to a method as defined herein before, said method further comprising:
a. transferring the spent grain obtained from the second separator into a second mixing vessel and mixing it with sparging water;
b. transferring the mixture of spent grain and sparging water into a third separator to remove spent grain; and
c. recirculating the aqueous stream from the third separator as sparging water to the first mixing vessel.

The gravity of the aqueous stream obtained from the second separator typically is in the range of 1-10°P, preferably in the range of 1-8°P. The gravity of the aqueous stream obtained from the third separator is typically very low, indicating that the spent grain is essentially exhausted. Preferably, the gravity of the aqueous stream from the third separator is in the range of 0.1-2°P, more preferably in the range of 0.1-1.5°P. The gravities realised in the aqueous streams obtained from the second and third separator are strongly dependent on the extract concentration achieved in the primary mash extract.

In order to produce a high gravity mash extract with minimum extract losses it is preferred to recirculate the complete aqueous stream obtained from the second separator to the mashing step. In the mashing step, besides the aqueous stream from the second separator, also aqueous streams generated downstream of the brewhouse, e.g. from yeast washing, may be employed. Typically, the recirculated aqueous stream from the second separator constitutes at least 80 wt. %, preferably at least 90 wt. % of the total liquid employed in the mashing step. Most preferably, the recirculated aqueous stream from the second separator provides all the mashing liquid that is used in the mashing step.

The invention is further illustrated by means of the following examples.

EXAMPLES

Example 1

A stream of 136 kg/hr hammer milled malt grist is dosed into a 70 l continuous stirred tank reactor and mixed with 313 kg/hr brewing water at a temperature of 50° C. Hereafter, part of the mixture, referred to as 'mash', is fed (340 l/hr) into a vertical cylindrical plug flow reactor. This malt mash stream provides the necessary enzymes (starch degrading amylases) to reduce the viscosity during heat treatment in the reactor. The reactor type used has been described in earlier patents by Heineken (WO 92/12231). The remaining part of the mash is pumped into a 50 l continuous stirred tank reactor in which a stream of 59 kg/hr of maize grits is dosed together with 140 kg/hr of water. The combined streams have a temperature of 50° C. which is well below the gelatinisation temperature of the maize starch. To gelatinise and liquefy the starch in the maize by enzymatic action, the suspension of malt mash, maize grits and water is subjected to direct steam injection and the temperature is raised to 78° C. At this temperature, a significant amount of the starch is gelatinised but also liquefied by the malt enzymes. Without these enzymes, the starch immediately forms a thick paste and clogs up the equipment. After this first temperature increase, the enzymes are allowed to act on the starch for 5 min in a plug flow reactor of 1 meter in length. Subsequently, another direct steam injection treatment follows which raises the temperature to 100° C. and the starch granules are fully gelatinised by a rest at this temperature for 5 min in a similar plug flow reactor.

The stream containing fully gelatinized starch granules (decoction stream) is now also pumped in the aforementioned stirred plug flow reactor in which it is combined with the malt mash stream. The decoction stream, having a temperature of 100° C., is combined with the malt mash stream, having a temperature of 50° C., yielding a total mash stream, having a temperature of 65° C. A heating jacket is used to control the saccharification temperature at 67° C. At the top of the column, the mash is heated by a heating jacket to a temperature of 78° C. and the total reactor is insulated to minimise heat losses. The mash has a total residence time inside the column of 65 minutes and the resulting mash is fed into the mash separation section.

Separation of the malt husks and other solids from the mash is done by two decanters. These decanters are scroll type bowl centrifuges with a continuous discharge of clarified liquid and thickened spent grains. The first decanter operates at a rotational speed of 3500 rpm and a differential screw speed of 2 rpm. This decanter has a theoretical capacity factor value of 1700 m².

The theoretical capacity factor (SIGMA value) of a decanter is calculated according to the following relation between: the length of the cylindrical bowl (L), the gravitational acceleration (g), the angular speed ($\omega$), the radius of the dam ring or overflow ring ($r_1$) and the radius of the cylindrical bowl ($r_2$).

$$\Sigma = \frac{\omega^2}{g}\pi L\left(\frac{3}{2}r_2^2 + \frac{1}{2}r_1^2\right)$$

The product (mash extract) is discharged from the first decanter to the next unit operation (boiling) and the spent grains are released into a small continuous stirred tank reactor. In the latter, 506 l/hr washing water of 80° C. is applied and with a residence time of 13 minutes, spent grains particles and water are homogeneously mixed.

The liquid phase of the resulting mixture is separated by a second decanter operating at 2 rpm differential screw speed, 4000 rpm and a theoretical capacity factor of 1800 m². The clarified liquid supernatant is recirculated and mixed with the outlet of the mashing column and this mixture is the feed of the first decanter. The product stream from the first decanter has an extract concentration of 14.8°P. Both decanters were equipped with a centrifugal fan and consequently work as a pump on the supernatant outlet.

The product from the mash separation is now referred to as wort and has a flow rate of 1030 kg/hr. Hop extract is dosed continuously in-line at a rate of 140 g/hr and the mixture is heated to a temperature of 102° C. by direct steam injection. By the positive head of the first decanter, the wort is pumped into a plug flow reactor. This column reactor has the same characteristics as the earlier described mashing conversion column. The volume of this reactor is 1 m³ and the residence time is 60 min. Typical reactions taking place in this reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in counter current operation to remove undesirable flavour compounds (mainly DMS) at a flow rate of 15 kg/h and at atmospheric conditions at the top of the stripper. The wort leaving the bottom of the stripper is fed into a small buffer with negligible dimensions and directly fed into a centrifuge of the discontinuous discharge type. This machine has a rotational speed of 7400 rpm and a theoretical capacity factor of 13000 m².

The theoretical capacity factor of a centrifuge is calculated on the basis of the method described in "Solid-Liquid Separation", 2$^{nd}$ edition, 1981, by Ladislav Svarovsky, Butterworth-Heineman. The factor is calculated according to the following relation between: the number of discs (n), the gravitational acceleration (g), the angular speed ($\omega$), the angle of the discs with the vertical feed pipe ($\alpha$), the inner radius of the discs package ($r_1$) and the outer radius of the discs package ($r_2$).

$$\Sigma = \frac{\omega^2}{g}\frac{2}{3}\pi n(r_2^3 - r_1^3)\cot\alpha$$

Next, cooling of the wort takes place in two parallel plate and frame wort coolers that lower the wort temperature from 95-100° C. to 8° C. by a two stage water-glycol set-up.

A total volume of 2.2 m³ cooled wort is continuously fed into a cylindrical/conical fermentation tank together with active yeast in a concentration of 2.5 g/l. Continuous oxygenation is achieved by in-line aeration. The primary batch fermentation was performed at 10° C. and when the extract concentration reached 6.5° P, temperature was allowed to increase to 13° C. After the diacetyl concentration was reduced to a level of 30 ppm, the contents of the tank were cooled to -1.5° C. in 24 hours. This cold phase was maintained for 6 days.

The beer was then filtered over a kieselguhr bright beer filter of the vertical disc type. After this filtration, the beer is stabilised with the usual dosings of PVPP and the necessary PVPP filtration. Finally, the beer was packaged in suitable containers (glass bottle).

Example 2

A stream of 120 kg/hr hammer milled malt grist is dosed into a 70 l continuous stirred tank reactor and mixed with 240 kg/hr brewing water at a temperature of 50° C. Hereafter, part of the mixture, referred to as 'mash', is fed into the vertical cylindrical plug flow reactor described in Example 1.

Unmalted adjunct in the form of rice grits at a flow rate of 100 kg/hr are dosed into a 50 l continuous stirred tank reactor in which a stream of 210 kg/hr of water is added. A stream of heat resistant starch degrading amylolytic enzymes is dosed to reduce the viscosity in subsequent heat treatment. The resulting mixture had a temperature of 50° C. which is well below the gelatinisation temperature of the rice starch. To gelatinise and liquefy the starch in the rice by enzymatic action, the suspension of rice grits, enzymes and water is subjected to direct steam injection and the temperature is raised to 78° C. At this temperature, a significant amount of the starch is gelatinised but also liquefied by the amylolytic enzymes. Without the enzymes, the starch immediately forms a thick paste and clogs up the equipment. After this first temperature increase, the enzymes are allowed to act on the starch for 5 min in a plug flow reactor of 1 meter in length. Subsequently, another direct steam injection treatment follows which raises the temperature to 100° C. and the starch granules are fully gelatinised by a rest at this temperature for 5 min in a similar plug flow reactor. To achieve the proper saccharification temperature (67° C. in this example) upon mixing with the malt mash, the decoction stream is cooled to a suitable temperature in a shell and tube heat exchanger.

This cooled stream is also pumped into the aforementioned stirred plug flow reactor, where it is combined with the malt mash stream. A heating jacket is used to control the saccharification temperature at 67° C. At the top of the column, the mash is heated by a heating jacket to a temperature of 78° C. and the total reactor is insulated to minimise heat losses. The mash has a total residence time inside the column of 60 minutes and the resulting mash is fed into the mash separation section.

Separation of the malt husks and other solids from the mash is done by two decanters. These decanters are scroll type bowl centrifuges with a continuous discharge of clarified liquid and thickened spent grains. The first decanter operates at a rotational speed of 3500 rpm and a differential screw speed of 3 rpm. This decanter has a theoretical capacity factor value of 1700 m². The product (mash extract) is discharged from the first decanter to the next unit operation (boiling) and the spent grains are released into a small continuous stirred tank reactor. In the latter, 510 l/hr washing water of 80° C. is applied and with a residence time of 13 minutes, spent grains particles and water are homogeneously mixed.

The liquid phase of the resulting mixture is separated by a second decanter operating at 3 rpm differential screw speed, 4000 rpm and a theoretical capacity factor of 1800 m². The clarified liquid supernatant is recirculated and mixed with the mash from the mashing column prior to entry of the first decanter. The product stream from the first decanter has an extract concentration of 16.4° P. Both decanters were equipped with a centrifugal fan and consequently work as a pump on the supernatant outlet.

The product from the mash separation is now referred to as wort and hop extract is dosed continuously in-line at a rate of 120 g/hr and the mixture is heated to a temperature of 102° C. by direct steam injection. By the positive head of the first decanter, the wort is pumped into a plug flow reactor. This column reactor has the same characteristics as the earlier described mashing conversion column. The volume of this reactor is 1 m³ and the residence time is 60 min. Typical reactions taking place in this reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent operation to remove undesirable flavour compounds (mainly DMS) at a flow rate of 15 kg/h and at atmospheric conditions at the top of the stripper. The wort leaving the bottom of the stripper is fed into a small buffer with negligible dimensions and directly fed into a centrifuge of the discontinuous discharge type. This machine has a rotational speed of 7400 rpm and a theoretical capacity factor of 13000 m². Analysis of the wort showed that the final attenuation limit is 82-83%.

Next, cooling of the wort takes place in two parallel plate and frame wort coolers that lower the wort temperature from 95-100° C. to 8° C. by a two stage water-glycol set-up.

A total volume of 2.2 m³ cooled wort is continuously fed into a cylindrical/conical fermentation tank together with active yeast in a concentration of 2.5 g/l. Continuous oxygenation is achieved by in-line aeration. The primary batch fermentation was performed at 110° C. and when the extract concentration reached 6.5°P, temperature was allowed to increase to 13° C. After the diacetyl concentration was reduced to a level of 30 ppm, the contents of the tank were cooled to −1.5° C. in 24 hours. This cold phase was maintained for 6 days.

The beer was then filtered over a kieselguhr bright beer filter of the vertical disc type. After this filtration, the beer is stabilised with the usual dosings of PVPP and the necessary PVPP filtration. Finally, the beer was packaged in suitable containers (glass bottle).

Example 3

A stream of 4.5 m³/hr of wort is produced with an extract concentration of 18° P at the end of the wort production process, using a combination of malt grist and unmalted maize grits. This wort is fermented and matured in continuous fermentors and subsequently stabilised in batch storage tanks, separated in a centrifuge and filtered on a bright beer filter. A detailed description of the brewing process is provided below.

At the front of the process, 1620 l/hr of brewing water (47° C.) is continuously mixed with 720 kg/hr malt grist. This malt grist was produced by a hammer mill equipped with a 2.5 mm screen. Both streams are fed into a continuous stirred tank reactor of 80 l working volume at a temperature of 45° C. Part of the resulting malt mash stream is directed to a subsequent plug flow mashing column, similar to the one described in Example 1. The other part (250 l/hr) of the malt mash stream is fed into a parallel process that enables the usage of unmalted maize grits as adjunct for the final beer product.

In this continuous decoction process, unmalted maize grits (350 kg/h) are fed into a continuous stirred tank reactor (120 l) together with a stream of brewing water (790 kg/h) of 52° C. and the abovementioned stream of malt mash. The resulting temperature in this 120 l vessel on combination of the streams is 50° C. which is sufficiently low to prevent excessive gelatinisation of the maize starch and the related viscosity increase. The mixture is pumped to a first holding column via a direct steam injection point. Steam is injected to elevate the temperature of the decoction stream to 75-78° C. and part of the maize starch is gelatinised. However, due to the presence of a portion of the malt mash the amylases from the malt break up the polymeric starch strains and lower the viscosity. The residence time of 15 min at the specified temperature enables the viscosity to be reduced to a level where another temperature increase to 100° C. can be applied without causing unacceptably high viscosities. This second step is done by another direct steam injection and a 5 min residence in a simple plug flow reactor. The resulting gelatinised mixture is cooled to 90° C. and subsequently fed into the mashing column where it is combined with the separated malt mash stream, producing a mixed stream having a temperature that is optimal for amylase activity and the complete conversion of starch of malt and maize to sugars.

The cylindrical plug flow reactor for the mashing process has been described in earlier patents by Heineken (WO 92/12231). At certain heights in the top of the column, the mash is heated by direct steam injection. Temperatures are chosen such that the conversion of malt starch to fermentable sugars is appropriate for the product desired. Present temperature profile has a saccharification rest at 66° C. and a mashing off temperature of 76° C. The mash has a residence time of 80 minutes and the resulting mash is fed into the mash separation section.

The mash separation section consists of two scroll type bowl centrifuges with a continuous discharge of clarified liquid and thickened spent grains, known generally as decanters. The first decanter operates at a rotational speed of 3650 rpm, a differential screw speed of 10 rpm and a theoretical capacity factor of 6200 m². The product (mash extract) is discharged from the first decanter to the next unit operation (boiling) and the spent grains are released into a small continuous stirred tank reactor. In the latter, 1150 l/hr washing water of 72° C. is applied and, with a residence time of 2 minutes, a homogeneous suspension is achieved. The liquid phase of the resulting mixture is separated by a second decanter operating at a rotational speed of 4000 rpm, a differential screw speed of 20 rpm and a theoretical capacity factor of 2600 m². The clarified liquid supernatant is recirculated and combined with the exit flow from the mashing column. This lowers the extract concentration in the feed of the first decanter to about 17° P. The spent grains from the second decanter are discharged to a silo. Both decanters were equipped with a centrifugal fan and consequently work as a pump on the supernatant outlet.

The product from the mash separation is now referred to as wort and has a flow rate of 4.5 m³/hr. Hop extract is dosed in-line at a rate of 32 g/hr and the mixture is heated to a temperature of 105° C. by direct steam injection. By the positive head of the first decanter, the wort is pumped into a plug flow reactor. This column reactor has the same characteristics as the earlier described mashing conversion column, but the height is proportionally increased with the increased flow rate in this part of the process. The residence time is therefore 67 min. Typical reactions taking place in the reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent to remove undesirable flavour compounds (mainly DMS) at a flow rate of 100 kg/hr and at atmospheric conditions. The wort leaving the bottom of the stripper is fed into a small buffer with negligible dimensions and directly fed into a centrifuge of the discontinuous discharge type. This machine has a rotational speed of 7400 rpm and a SIGMA value of 70000 $m^2$.

Cooling of the wort takes place by two parallel plate and frame wort coolers that lower the wort temperature from 95-100° C. to 4° C. by a two stage water-glycol set-up.

Cooled wort is fed into the first stirred fermentation vessel with a net working volume of 14 $m^3$. The vessel is operated at a temperature of 10° C. and under aerobic conditions by the continuous addition of an aerated recirculated stream from the downstream end of the process, containing thickened yeast as the main constituent besides water. The gravity in this vessel is 13° P. The yeast necessary for the fermentation is added in the form of the abovementioned recirculated stream.

The fermentation broth from the first fermentation vessel is transferred to the second vessel. This vessel has a working volume of 160 $m^3$ and is kept at a temperature of 13° C. by wall cooling. The original gravity in this vessel is 7° P and the yeast concentration is 80 g wet yeast/l. The outlet of this vessel is split into two streams: one part (2.5 $m^3$/hr) is combined with another stream from the end of the process and recirculated to the first fermentation vessel, whereas the other part (5.3 $m^3$/hr) is fed into a third fermentation vessel.

This third vessel has a working volume of 140 $m^3$ and the contents have an original gravity of 3.5° P. The product of this vessel is transferred to a yeast sedimentation vessel with a working volume of 7 $m^3$. The yeast sedimentation vessel separates the main part of the yeast (90-95%) from the green beer. The compacted yeast in the bottom of the yeast sedimentation vessel has a yeast concentration of 200 g wet yeast/l. This stream is partly recirculated to the front of the fermentation process and partly sent to waste surplus yeast storage. The part of the yeast sent to surplus is controlled on the basis of the amount that is leaving the top of the yeast sedimentation vessel and the amount of yeast grown in the fermentation vessels. Green beer from the top of the yeast sedimentation vessel is continuously fed into either batch maturation tanks or into a continuous maturation vessel.

In case of the batch option, the working volume of the maturation tank is equal to the total volume of fermented wort produced in 24 hours. The temperature is allowed to raise to 15° C. by heat exchange in the pipe towards the maturation tank and/or natural fermentation heat development. This temperature favours conversion of acetolactate (a metabolic fermentation product) to diacetyl. Due to the presence of yeast in this phase, the yeast can take up the diacetyl and convert it to acetoin or subsequent metabolites. The negative impact of diacetyl in the beer is therewith removed and residual diacetyl levels are typically determined to be <20 ppb. After the diacetyl reduction has reached acceptable levels, the beer is cooled down to −1.5° C. and stored for several days. After this period, the beer is filtered over kieselguhr with 80-100 g/l kieselguhr as bodyfeed. Prior to filtration, the beer is centrifuged with a disc type separator that operates at 70,000 $m^2$ theoretical capacity factor to remove total suspended solids with an efficiency of 95-98%. Typical filtration runs are performed on 6000-8000 hl at a flow rate of 4-5.5 hl/$m^2$/hr. After this filtration, the beer is stabilised with the usual dosings of PVPP and the necessary PVPP filtration. Finally, the beer is packaged in any suitable container (bottle, keg, can).

When using a continuous maturation process, the green beer is continuously fed in the top of a 520 $m^3$ vessel via a spray ball that distributes the beer over the surface area of the tank. In this example, the beer was heated from 13° C. to 15° C. with a shell and tube heat exchanger. This will accelerate the abovementioned conversion of α-acetolactate formed during primary fermentation towards diacetyl. The yeast will settle through the beer and will establish the abovementioned conversion of diacetyl and other vicinal diketones to acetoin and subsequent metabolites. The beer has a residence time in this example of 100 hours and the residual diacetyl levels are 7.3±2.3 ppb (95% CI, n=6). The yeast settles at the conical bottom of the maturation tank and is removed and treated as rest beer. The matured beer is removed from just above the settled yeast cone and is transferred via a continuous heat exchanger towards batch cold storage tanks at a temperature of −1.5° C.

Cold storage tanks are filled in one day and thereafter, the beer is stored for at least 2 days at a temperature of −1.5° C. After this storage period, sedimented yeast is purged from the bottom of the tank and the remaining beer is separated over a disc type centrifuge as described above. Directly after this treatment, the beer is filtered over a kieselguhr filter at a typical flow rate of at a flow rate of 4-5.5 hl/$m^2$/hr with a filtration run of on 6000-8000 hl.

After the beer has been stabilised by PVPP treatment, it is packaged in the desired packaging materials (bottle, can, keg).

The invention claimed is:

1. A method of producing a mash extract comprising:
   a. mixing a first malt enzyme source with an aqueous liquid to obtain an aqueous malt enzyme suspension;
   b. separately, mixing a second enzyme source with one or more starch-containing adjuncts to obtain a decoction suspension while maintaining temperature conditions that do not cause significant gelatinisation of the starch;
   c. subjecting the decoction suspension to a first heat treatment of at least 1 minute at 65-85° C. to simultaneously partially gelatinise and enzymatically degrade the starch;
   d. subjecting the decoction suspension to a second heat treatment of at least 1 minute at 85-120° C. to gelatinise the starch at an increased rate and to a higher extent;
   e. combining the heated decoction suspension obtained from the second heat treatment with the aqueous malt enzyme suspension from step a. to obtain a mash;
   f. maintaining the mash at 35-85° C. for at least 20 minutes; and
   g. separating the heated mash into spent grain and mash extract,
   wherein the first and the second heat treatment comprise direct steam injection into the suspension, and wherein steps (a)-(g) are performed in a continuous fashion.

2. The method according to claim 1, wherein part of the aqueous malt enzyme suspension prepared in step a. is employed as the second enzyme source in step b.

3. The method according to claim 1, wherein 1-50 wt. % of the aqueous malt enzyme suspension prepared in step a. is employed as the second enzyme source in step b. and the remainder of the aqueous malt enzyme suspension is combined with the heated decoction suspension obtained from the second heat treatment.

4. The method according to claim 1, wherein at least 5 wt. % of the fermentable sugars contained in the mash extract originate from the one or more starch-containing adjuncts.

5. The method according to claim 1, wherein the composition of aqueous malt enzyme suspension of step a. and the second enzyme source of step b. is identical.

6. The method according to claim 1, wherein the starch-containing adjunct is derived from a cereal selected from the group consisting of rice, maize, sorghum, rye, oats, wheat, corn, tapioca flour, potato, malt, barley and combinations thereof.

7. The method according to claim 1, wherein the starch-containing adjunct is pre-processed by torrification, flaking, cooking, micronisation or roasting.

8. The method according to claim 1, wherein the viscosity of the decoction suspension up till the second heat treatment does not exceed 10 Pa·s.

9. The method according to claim 8, wherein the viscosity of the decoction suspension up till the second heat treatment does not exceed 5 Pa·s.

10. The method according to claim 9, wherein the viscosity of the decoction suspension up till the second heat treatment does not exceed 1 Pa·s.

11. The method according to claim 1, further comprising cooling the decoction suspension to a temperature of 60-100° C. after the second heat treatment and prior to being combined with the aqueous malt enzyme suspension.

12. The method according to claim 1, wherein the decoction suspension is prepared by mixing the second enzyme source with one or more starch-containing adjuncts and additional water.

13. The method according to claim 1, wherein the malt enzyme suspensions and the decoction suspensions have a solids content maintained within the range of 200-500 g/l.

14. The method according to claim 1, wherein the aqueous liquid used to produce the aqueous malt enzyme suspension is recirculated wash water stream from the mash extract production.

15. The method according to claim 1, wherein the viscosity of the decoction suspension of (c) does not exceed 1 Pa·s.

* * * * *